Sept. 18, 1956  F. M. LEWIS ET AL  2,763,609
VULCANIZATION OF SILICONE RUBBER
WITH HIGH ENERGY ELECTRONS
Filed June 3, 1952
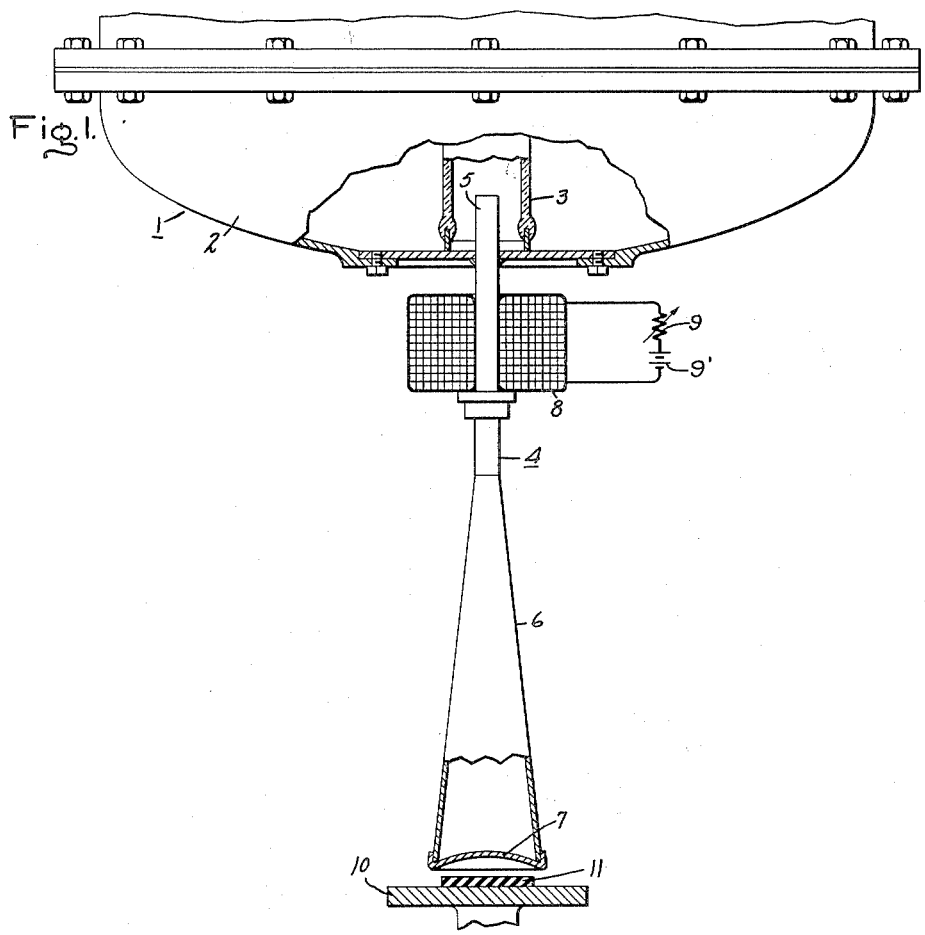
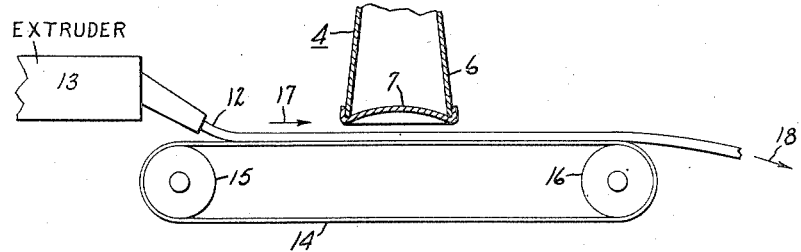
Inventors:
Frederick M. Lewis,
Elliott J. Lawton,
by Abraham Cohen
Their Attorney.

United States Patent Office 2,763,609
Patented Sept. 18, 1956

2,763,609

VULCANIZATION OF SILICONE RUBBER WITH HIGH ENERGY ELECTRONS

Frederick M. Lewis, Ballston Lake, and Elliott J. Lawton, Schenectady, N. Y., assignors to General Electric Company, a corporation of New York Application June 3, 1952, Serial No. 291,542

8 Claims. (Cl. 204—154)

This invention relates to the curing or vulcanization of organopolysiloxanes convertible to the solid elastic state. More particularly, the invention is concerned with the curing of the aforesaid organopolysiloxanes by irradiation of the latter with high energy electrons.

Heretofore, the vulcanization or curing of organopolysiloxanes to the solid elastic state has been effected by means of curing agents such as benzoyl peroxide, tertiary butyl perbenzoate, etc., in combination with the application of heat. However, the use of such curing agents is accompanied by the disadvantage that after the product is converted to the solid, elastic, substantially infusible and insoluble state, the presence of chemical residues of the aforesaid curing agents tends to affect deleteriously some of the properties of the cured product, such as the heat-aging properties, the electrical properties, etc.

It is, therefore, an object of this invention to cure or vulcanize (to the substantially infusible and insoluble state) organopolysiloxanes convertible to the solid elastic state without using chemical curing agents or heat.

It is another object of the invention to obtain cured solid elastic organopolysiloxanes having good heat resistance.

It is a still further object of the invention to cure silicone rubber by means of a continuous process which does not required heat.

A still further object is to vulcanize silicone rubber filled with fillers which cannot be satisfactorily cured by the use of the usual chemical curing agents.

Another object of the invention is to effect vulcanization of organopolysiloxanes to the solid elastic state in varying degrees of depth which cannot be done by presently known methods.

Other objects of the invention will be apparent from the description which follows.

In accordance with our invention, all the foregoing objects can be attained and the above-discussed disadvantages obviated by vulcanizing organopolysiloxanes convertible to the solid elastic state with high energy electrons. Over wide limits, the cure is essentially independent of the dose rate, but rather depends on the total dose. The convertible organopolysiloxane or silicone compositions which may be highly viscous masses, or gummy elastic solids, depending on the state of condensation, the condensing agent employed, the starting organopolysiloxane used to make the convertible organopolysiloxances, etc., will hereinafter be referred to as "convertible organopolysiloxane" or, more specifically, as "convertible methylpolysiloxane." Although convertible organopolysiloxanes with which the present invention is concerned are well known, for purposes of showing persons skilled in the art the various convertible organopolysiloxanes which may be employed in the practice of the present invention, attention is directed to the convertible organopolysiloxanes disclosed and claimed in Agens Patent 2,448,756 and Sprung et al. Patent 2,448,556, both issued September 7, 1948; Sprung Patent 2,484,595, issued October 11, 1949; Krieble et al. Patent 2,457,688, issued December 28, 1948; Hyde Patent 2,490,357, issued December 6, 1949; Marsden Patent 2,521,528, issued September 5, 1950; and Warrick Patent 2,541,137, issued February 13, 1951.

It will, of course, be understood by those skilled in the art that other convertible organopolysiloxanes containing the same or different silicon-bonded organic substituents (e. g., methyl, ethyl, propyl, phenyl, tolyl, xylyl, benzyl, phenylethyl, naphthyl, chlorophenyl, both methyl and phenyl, etc., radicals) connected to silicon atoms by carbon-silicon linkages, may be employed without departing from the scope of the invention.

The particular convertible organopolysiloxane used is not critical and may be any one of those described in the foregoing patents and generally obtained by condensing a liquid organopolysiloxane containing an average of from about 1.95 to 2.25, preferably from about 1.98 to about 2.05, silicon-bonded organic groups per silicon atom. The usual condensing agents which may be employed and which are well known in the art may include, for instance, ferric chloride hexahydrate, phenyl phosphoryl chloride, alkaline condensing agents, such as potassium hydroxide, sodium hydroxide, etc. These convertible organopolysiloxanes generally comprise polymeric diorganosiloxanes which may contain, for example, 2 mol per cent copolymerized monorganosiloxane, for example, copolymerized monomethylsiloxane. Generally, we prefer to use as the starting liquid organopolysiloxane from which the convertible organopolysiloxanes are prepared, one which contains about 1.999 to 2.01, inclusive, organic groups, for example, methyl groups per silicon atom where more than about 90 per cent of the silicon atoms in the polysiloxane contain two silicon-bonded dialkyl groups.

The starting organopolysiloxanes used to make the convertible organopolysiloxanes by condensation thereof preferably comprise organic substituents consisting essentially of monovalent organic radicals attached to silicon through carbon-silicon linkages, there being on the average between 1.95 and 2.25 organic radicals per silicon atom, and in which the siloxane units consist of units of the structural formula $R_2SiO$ where R is preferably a radical of the group consisting of methyl and phenyl radicals. At least 80 per cent of the total number of R groups are preferably methyl radicals. The polysiloxane may be one in which all of the siloxane units are $(CH_3)_2SiO$ or the siloxane may be a copolymer of dimethylsiloxane and a minor amount (e. g., from 1 to 20 mol per cent) of any of the following units alone or in combination therewith: $C_6H_5(CH_3)SiO$ and $(C_6H_5)_2SiO$.

The convertible organopolysiloxane may be compounded with various fillers on ordinary rubber compounding rolls, for example, silica, silica aerogel, titanium dioxide, calcium silicate, ferric oxide, chromic oxide, cadmium sulfide, asbestos, glass fibers, calcium carbonate, carbon black, lithopone, talc, etc., and molded, extruded, cast or otherwise shaped prior to the irradiation with the high energy electrons to give a product which after irradiation has physical characteristics, e. g., elasticity, compressibility, etc., similar to those of natural rubber and other known synthetic rubbers and whose strength properties are comparable with those of silicone rubbers cured by means of chemical vulcanization accelerators and heat.

The features of this invention may be best understood by reference to the following description taken in connection with the accompanying drawings in which Fig. 1 is a partially sectionalized, simplified view of apparatus useful in the practice of the invention; and Fig. 2 is a partially sectionalized view of alternative apparatus which may be employed to obtain the desired results in accordance with the invention.

Referring particularly to Fig. 1, there is shown high voltage apparatus 1 capable of producing a beam of high energy electrons for irradiating the convertible organopolysiloxane in accordance with the invention. High voltage apparatus 1 may be of the type disclosed in United States Patent 2,144,518—Westendorp, issued January 17, 1939, and assigned to the assignee of the present invention. In general, this apparatus comprises a resonant system having an open-magnetic circuit inductance coil (not shown) which is positioned within a tank 2 and energized by a source of alternating voltage to generate high voltage across its extremities. At the upper end (not shown) of a sealed-off, evacuated, tubular envelope 3 is located a source of electrons which is maintained at the potential of the upper extremity of the inductance coil whereby a pulse of electrons is accelerated down envelope 3 once during each cycle of the energizing voltage when the upper extremity of the inductance coil is at a negative potential with respect to the lower end. Further details of the construction and operation of the high voltage apparatus described in Fig. 1 may be found in the aforementioned Westendorp patent and in Electronics, volume 16, pages 128–133 (1944).

Referring further to Fig. 1, to permit utilization of the high energy electrons accelerated down envelope 3, there is provided an elongated metal tube 4, the upper portion 5 of which is hermetically sealed to a tank 2, as illustrated, by any convenient means such as silver solder. The lower portion 6 of the tube 4 is conical in cross section to permit an increased angular spread of the electron beam. The emergence of high energy electrons from tube 4 is facilitated by an end-window 7 which may be hermetically sealed to tube 4 by means of silver solder. End-window 7 should be thin enough to permit electrons of desired energy to pass therethrough but thick enough to withstand the force of atmospheric pressure. Stainless steel of about 0.002" thickness has been found satisfactory for use with electron energies of above 230,000 electron volts or greater because this thickness of stainless steel stops electrons of lower energies. Beryllium and other materials of lower stopping power may also be advantageously employed. By forming end-window 7 in arcuate shape as shown, greater strength for resisting the force atmospheric pressure may be obtained for a given window thickness. Desired focusing of accelerated electrons may be secured by a magnetic field generating winding 8 energized by a source of direct current 9 through a variable resistor 9'.

In producing vulcanization or curing of the convertible organopolysiloxane with the high voltage apparatus 1, a platform 10, upon which the convertible organopolysiloxane 11 is positioned, is supported in the path of the electrons emerging from end-window 7 as illustrated. High energy electrons penetrate the convertible organopolysiloxane (preferably containing a filler) to a depth dependent upon the energy of the electrons and density of the material, and thus initiate curing or vulcanization to form the solid, elastic, substantially infusible and insoluble products of the present invention.

Conversion of the organopolysiloxane to the vulcanized, solid, elastic state is essentially independent of the dose accumulation rate of electron irradiation but is dependent upon the total dose. By dose accumulation rate is meant the number of roentgen units of electron irradiation per unit time applied to the organopolysiloxane. Total dose refers to the total number of roentgen units applied in the curing operation. A roentgen unit, as usually defined, is the amount of radiation that produces one electrostatic unit of charge per cubic centimeter of air under standard temperature and pressure conditions, and as employed here, refers to the amount of electron radiation measured with an air-equivalent ionization chamber at the position of the surface of the convertible organopolysiloxane. The dependence of the cure upon total dose will be evident from the examples which are disclosed below. The total dose may be varied depending on the degree of cure desired, and the depth of cure may be changed as desired by varying the energy level of the electron irradiation. The actual degree of cure increases as the total dose is increased. In practice, it has been found that total doses of from about $2 \times 10^6$ roentgens (R) to $7 \times 10^6$ R are desirable for most uses. However, total doses outside these limits may be employed where special applications are involved.

In order that those skilled in the art may better understand how the present invention may be practiced, the following examples are given by way of illustration and not by way of limitation. The apparatus employed was that described in Fig. 1 with 800 KVP electrons (KVP refers to the peak voltage in kilovolts generated by the inductance coil with high voltage apparatus 1 during the conducting half cycle, and thus is a measure of the energy of electrons emerging from the window 7). A total dosage ranging from about $1 \times 10^6$ R to $10 \times 10^6$ R was used.

The irradiation dose was governed by the magnitude of the beam current, the position of the sample in the beam, and the length of time the sample was exposed to the beam. The actual determination of the rate of accumulation of dose in R/sec. at the sample position in question was determined by means of an air-equivalent ionization chamber. For example, in carrying out the tests described below, it was possible to realize a total dose of $2.5 \times 10^6$ R in 17.5 seconds at a distance of 10 cm. from the window of the accelerating tube with a beam current of 120 microamperes. In other instances, where the material was being extruded and irradiated at the same time, the passage of the extruded composition through the beam was at a constant rate, this extrusion rate being fixed so that, for a particular beam current and location or position in the beam, the material remained exposed to the beam of electrons long enough to accumulate the total dose which was desired for curing.

EXAMPLE 1

In this example, essentially pure octamethylcyclotetrasiloxane was condensed at a temperature of about 150° C. with 0.01 per cent, by weight, thereof KOH to give a highly viscous, substantially non-flowable, convertible polymeric dimethylsiloxane. This convertible organopolysiloxane was thereafter filled with various fillers, for example, silica aerogel, carbon black and lignin, and molded at room temperature into flat sheets and placed at about 10 cm. distance from the window of the apparatus described in Fig. 1 and irradiated with the high energy electrons. The thickness of these samples was about 3 mm., and it was found that a given dosage yielded the same cure whether delivered over a period of 7 seconds or 70 seconds. In each case, first one side of the sample was irradiated, and then it was turned over and irradiated on the other side so as to produce a substantially uniform core throughout the sample. The following Table I shows the physical properties of products treated in accordance with the present invention. Although the results on the lignin-filled sample are not shown, it was found that the use of high energy electrons to cure lignin-filled convertible organopolysiloxane (100 parts of the convertible polymeric dimethylsiloxane and 75 parts lignin) effected satisfactory cure or vulcanization of the convertible methylpolysiloxane to give a product having good tensile strength and elongation, whereas attempts to cure such a filled material using either benzoyl peroxide or tertiary butyl perbenzoate in accordance with the usual manner with the concomitant application of heat resulted in no detectable vulcanization of such filled product.

*Table I*

| Filler | Total Dose in Roentgens | Tensile, p. s. i. | Percent Elongation |
|---|---|---|---|
| Silica aerogel a | $1 \times 10^6$ | 777 | 527 |
|  | $2 \times 10^6$ | 909 | 420 |
|  | $3 \times 10^6$ | 897 | 310 |
|  | $4 \times 10^6$ | 952 | 207 |
|  | $5 \times 10^6$ | 871 | 183 |
|  | $6 \times 10^6$ | 849 | 197 |
|  | $7 \times 10^6$ | 837 | 143 |
|  | $8 \times 10^6$ | 772 | 117 |
| Carbon black b | $1 \times 10^6$ | 259 | 1,125 |
|  | $2 \times 10^6$ | 456 | 495 |
|  | $4 \times 10^6$ | 434 | 270 |
|  | $6 \times 10^6$ | 314 | 180 |
|  | $10 \times 10^6$ | 338 | 110 | a 100 parts polymeric dimethylsiloxane and 45 parts silica aerogel.
b 100 parts polymeric dimethylsiloxane and 50 parts carbon black (Statex 93).

It should be noted that the penetration of the electrons is directly proportional to the voltage and inversely proportional to the density of the material so that for a 3,000 kv. machine, total penetration is equivalent to about 13 mm. of water or for a density of 1.5, which is approximately that of the silicone rubber filled with silica aerogel, is about 9 mm. Using machines operating, for instance, at voltages up to 3,000 kv. and about 10 milliamperes beam current, it is possible to cure larger quantities of material and at a fast rate.

Threads of polymeric dimethylsiloxane containing the carbon black filler referred to above and free of any chemical curing agent have been extruded and passed by the exit window of the electron acceleration employed for effecting cure of the various silicone rubber compositions described in Example 1, to yield a cured silicone rubber thread (0.030" diameter) which was cured as fast as it was being extruded. The material was cured at a rate of about 0.6" per second and at a total dose of approximately $3 \times 10^6$R using the apparatus described above.

EXAMPLE 2

In this example, 100 parts of the convertible polymeric dimethylsiloxane described in Example 1 containing 50 parts, by weight, carbon black (Statex 93), was extruded in the form of a thin wall tubing whose wall thickness was about 0.012" and outside diameter about ¼". The tube was electron cured as it was being extruded at a rate of about 0.1" per second. The average curing dose was about $3 \times 10^6$R. As a result of this treatment, it was found that the tubing was completely cured and was substantially infusible and insoluble. To make tubing from this material using chemical curing agents would be quite difficult, especially since such thin wall tubing would normally collapse before complete cure could be effected. This cured tube was quite heat resistant and even after many hours at elevated temperatures was extremely flexible.

Continuous vulcanization of extruded convertible organopolysiloxanes may be obtained with apparatus such as that illustrated in Fig. 2 wherein similar numerals are utilized to identify like elements hereinbefore described. As shown, the convertible organopolysiloxane 12 is extruded from an extruder 13 in the shape of the orifice of the die and continuously positioned upon a moving belt 14 which may comprise, for example, a continuous thin sheet of metal, such as stainless steel about 0.002" in thickness, extending around pulleys 15 and 16. One of the pulleys may be connected to a driven shaft (not shown) so that the convertible organopolysiloxane after being positioned upon the moving belt, passes under end-window 7 as is indicated by arrow 17 and is irradiated by high energy electrons, and thereafter passes off the moving belt in the direction of the arrow at 18.

It will be readily realized that other forms of electron accelerating apparatus may be employed instead of the high voltage apparatus A, described above and in the accompanying drawings, providing such alternative apparatus is capable of delivering the total doses specified above as desirable for accomplishing the purposes of the invention. For example, a linear accelerator of the type described by J. C. Slater in Reviews of Modern Physics, volume 20, No. 3, pages 473–518 (July 1948), may be utilized. In general, the energy of the electrons employed in the practice of the invention may range from about 200,000 electron volts to 20,000,000 electron volts or higher depending upon the depth to which it is desired to vulcanize the heat-convertible organopolysiloxane. To decrease wasteful energy absorption between the point of exit of electrons from the accelerating apparatus and the material being treated, a vacuum chamber having thin entrance and exit windows may be inserted in this space.

It will, of course, be apparent to those skilled in the art that in addition to the convertible organopolysiloxane employed in the foregoing examples, other organopolysiloxanes, many examples of which have been given previously, may be used without departing from the scope of the invention. Various other fillers may be used (if desired, fillers may be omitted), and obviously the amount of fillers may be varied considerably depending, for example, on the particular filler employed, particle size of filler, the specific convertible organopolysiloxane used, the purpose for which the finished product is to be used, etc. Thus, convertible organopolysiloxane may be produced containing, for instance, from 0 to about 150 per cent, by weight, filler based on the entire weight of filled material. Generally, the filler (when used) on a weight basis may be employed in an amount equal to from about 0.15 to 3 parts of filler per part of convertible organopolysiloxane, for example, convertible polydimethylsiloxane. When one employs, for instance, silica aerogel as the filler, the amount of such filler which may advantageously be used with the convertible organopolysiloxane is much less than usual fillers. In such instances, the amount of silica aerogel which may be tolerated in the filler composition is generally below 50 to 60 parts of the silica aerogel filler per 100 parts of the convertible organopolysiloxane. Obviously, the rate of treatment, that is, the dosage rate accumulation or the electron impingement rate, and the time of treatment or the rate at which the convertible organopolysiloxane has moved past the point at which irradiation is being carried out, etc., may be varied widely without departing from the scope of the invention. In some applications, it may be desirable to effect curing of only an outside surface of silicone rubber film so that the inside surface is substantially uncured and in a somewhat tacky state. Such products can be used as tapes which can be wrapped around, for instance, conductors, and thereafter subjected to further curing, for instance, electron irradiation, whereby the uncured portion is caused to become vulcanized in place using the wrapping force as means for pressure instead of using expensive molds for the purpose.

In some instances, it may be desirable to use the presently described invention (for rapid intermediate precures) with convertible organopolysiloxanes containing curing agents, e. g., benzoyl peroxide, etc., incorporated therein. For example, in manufacturing silicone rubber tubing, it may be desirable to set the tube in its final physical configuration (as a tube) by means of the electron precuring, whereby incomplete curing is effected, but will be sufficiently cured to retain its shape when the cure is later completed by means of heat in combination with the added curing agent to give a substantially completely cured silicone rubber tubing.

The products of this invention are useful in applications, such as, for instance, tubing, electrical insulation (e. g., as conductor insulation, etc.), shock absorbers, etc. They are particularly useful as gaskets in applications involving high temperature conditions, especially in those places where they may be subjected to the effects of halogenated hydrocarbons as insulating media, namely, in the manufacture of capacitors. Because of their improved heat resistance, they are valuable as materials for use in applications where natural or other synthetic rubbers may fail owing to the deleterious effect of heat. Elastomers produced by the practice of our invention have the additional property of retaining their flexibility at low temperatures, for example, at temperatures as low as at least minus 60° C.

What we claim as new and desire to secure by Letters Patent of the United States is:

1. The process for effecting curing of an organopolysiloxane convertible to the solid elastic state, there being present in the aforesaid organopolysiloxane from 1.98 to 2.05 organic groups per silicon atom, which process comprises irradiating the aforesaid convertible organopolysiloxane with high energy electrons, the energy of the electrons ranging from about 200,000 to 20,000,000 electron volts and employing a dose of at least $1 \times 10^6$ roentgens.

2. The process for curing a polymeric dimethylsiloxane convertible to the solid elastic state, there being present in the aforesaid polymeric dimethylsiloxane from 1.98 to 2.05 methyl groups per silicon atom, which comprises irradiating the aforesaid convertible polymeric dimethylsiloxane with high energy electrons, the energy of the electrons ranging from about 200,000 to 20,000,000 electron volts and employing a dose of at least $1 \times 10^6$ roentgens.

3. The process of curing a convertible methyl phenyl polysiloxane convertible to the solid elastic state, there being present in the aforesaid methyl phenylpolysiloxane from 1.98 to 2.05 total methyl and phenyl radicals per silicon atom, which comprises irradiating the aforesaid methyl phenyl polysiloxane with high energy electrons, the energy of the electrons ranging from about 200,000 to 20,000,000 electron volts and employing a dose of at least $1 \times 10^6$ roentgens.

4. The process as in claim 1 in which the convertible organopolysiloxane contains a filler.

5. The process as in claim 1 in which the convertible organopolysiloxane contains silica aerogel as the filler.

6. The process as in claim 1 in which the convertible organopolysiloxane contains carbon black as the filler.

7. The process as in claim 2 in which the convertible methylpolysiloxane contains silica aerogel as the filler.

8. The process for curing a carbon black-filled methyl polysiloxane convertible to the cured, solid elastic state and containing an average of from about 1.98 to 2.05 methyl groups per silicon atom, which process comprises irradiating the aforesaid filled convertible methyl polysiloxane with high energy electrons, the energy of the electrons ranging from about 200,000 to 20,000,000 electron volts and employing a dose of at least $1 \times 10^6$ roentgens.

References Cited in the file of this patent

UNITED STATES PATENTS

| | | |
|---|---|---|
| 2,350,330 | Remy | June 6, 1944 |
| 2,405,019 | Dalin | July 30, 1946 |
| 2,448,556 | Spring et al. | Sept. 7, 1948 |
| 2,484,595 | Spring | Oct. 11, 1949 |
| 2,516,848 | Brasch | Aug. 1, 1950 |

FOREIGN PATENTS

| | | |
|---|---|---|
| 299,735 | Great Britain | Feb. 28, 1928 |

OTHER REFERENCES

Synthetic Resins by C. Ellis, vol. I (1935), p. 164.

Proceedings of the Physical Soc. of London, vol. 50 (1938), pages 438–440 (an article by Hopwood and Phillips).

The Electrochemistry of Gases and Other Dielectrics, by G. Glockler and S. C. Lind, John Wiley & Sons, N. Y. (1939), pp. 84–85.

Chemical and Eng. News (June 25, 1945), vol. 13, 12, p. 1082, an article by Gardner et al.

United States Atomic Energy Comm. AECD–2078. Article by Burr et al., declassified June 25, 1948. Obtainable from Atomic Energy Comm. at Oak Ridge, Tenn.

The Plastics Institute Transactions (April 1950), vol. 18, 32, pp. 1–11 (an article by Poole).